（12） United States Patent
Cerchione et al.

(10) Patent No.: US 7,286,914 B2
(45) Date of Patent: Oct. 23, 2007

(54) COLLECTION AND DISTRIBUTION OF MARITIME DATA

(76) Inventors: Angelo J. Cerchione, deceased, late of Deep Gap, NC (US); by Peggy Cerchione, legal representative, 371 Lawrence Greene Rd., Deep Gap, NC (US) 28618; Joseph P. Kelly, 3999 Rocky Rd., Lenoir, NC (US) 28645; Victor John Yannacone, Jr., 58 Rose Ave., Patchogue, NY (US) 11772

( * ) Notice: Subject to any disclaimer, the term of this patent is extended or adjusted under 35 U.S.C. 154(b) by 146 days.

(21) Appl. No.: 10/464,177

(22) Filed: Jun. 18, 2003

(65) Prior Publication Data

US 2003/0233176 A1 Dec. 18, 2003

Related U.S. Application Data

(60) Provisional application No. 60/389,569, filed on Jun. 18, 2002.

(51) Int. Cl.
*G08B 23/00* (2006.01)
*G08B 9/00* (2006.01)

(52) U.S. Cl. ......................................... 701/21; 340/989
(58) Field of Classification Search .................. 701/21, 701/207, 213, 117; 342/357.09, 352, 57, 342/96, 357.07; 340/989, 992
See application file for complete search history.

(56) References Cited

U.S. PATENT DOCUMENTS 3,971,018 A * 7/1976 Isbister et al. ................. 342/41
5,307,074 A * 4/1994 Janex ............................. 342/41
5,404,135 A * 4/1995 Janex ........................... 340/988
5,666,648 A * 9/1997 Stuart .......................... 370/321
6,249,241 B1 * 6/2001 Jordan et al. ................. 342/41
6,463,419 B1 * 10/2002 Kluss ............................ 705/26
6,469,664 B1 * 10/2002 Michaelson et al. ... 342/357.13
6,658,349 B2 * 12/2003 Cline .......................... 701/207
2001/0054961 A1 * 12/2001 Twining .................. 340/573.1
2002/0023010 A1 * 2/2002 Rittmaster et al. ............ 705/26
2002/0049660 A1 * 4/2002 Obrador et al. ............... 705/37

* cited by examiner

*Primary Examiner*—Dalena Tran
(74) *Attorney, Agent, or Firm*—The Webb Law Firm

(57) ABSTRACT

A system for collecting and distributing maritime data includes a vessel configured to transmit a signal representative of a current location of the vessel or an expected location of the vessel; a computer network including one or more databases, each of which includes one or more zone of concern data, wherein the zone of concern data corresponds to a zone of concern; and a service provider configured to receive the signal, retrieve the one or more zone of concern data from the computer network based upon the signal and transmit the one or more zone of concern data to the vessel. The zone of concern data is maritime data that is conducive to the safe, secure and economical operation of the vessel. The zone of concern is a three-dimensionally distance-bounded area surrounding the vessel or a time-bounded area surrounding the vessel.

15 Claims, 3 Drawing Sheets

COLLECTION AND DISTRIBUTION OF MARITIME DATA

CROSS REFERENCE TO RELATED APPLICATIONS

This application claims the benefit of U.S. Provisional Application Ser. No. 60/389,569, filed Jun. 18, 2002, and entitled "Method and Apparatus for Collecting and Distributing Maritime Date", the contents of which are hereby incorporated herein by reference.

BACKGROUND OF THE INVENTION

1. Field of the Invention

The present invention is directed to a method and apparatus for collecting and distributing relevant maritime data to a vessel based upon its location and/or expected location.

2. Description of Related Art

Maritime vessels, including commercial, research, governmental, and recreational vessels, require accurate and readily available information while at-sea or in-port. The Internet is replete with information that would be conducive to the safe, secure and economical operation of a vessel, critical to the success of the vessel's voyages and the survival of the crew. Such information may include, but is not limited to, weather data, accident data, health crises data, piracy data, terrorism data, open warfare data, disease data, emergency re-routing data, political unrest data, and port contact information data, to name a few. It would be desirable to make this information directly and readily available to a vessel. Currently, however, there are obstacles that prevent the efficient implementation of this objective.

The above-identified types of information are usually stored in Internet accessible disparate databases having proprietary data structures. Traditionally, an on-shore support team assigned to the vessel receives a request for information from the vessel. The vessel is required to transmit its location, so that the on-shore support team can properly query the appropriate databases and provide information relevant to the vessel's location. Due to the proprietary nature of each of the databases, the on-shore support team is required to format database queries according to the type of database from which any of the above-identified types of information is sought. The resultant data must then be clearly and concisely communicated to the vessel. Unfortunately, this process introduces a significant amount of latency from the moment the request for information is transmitted by the vessel until the fulfillment of that request by the on-shore support team.

In common practice, the world's commercial vessels do not carry the specialized communications gear that would allow them direct access to any such digital information archived on the Internet. Even if a ship could achieve a secure and reliable connection to the Internet at sea, the current cost of satellite communications would make it prohibitively expensive to search such archives and retrieve any findings. This is especially true if the database returns an exorbitant amount of data, thereby consuming a great deal of communications bandwidth and/or communications time. Additionally, many of the databases that contain the information required to respond to a request are slow-opening. For example, a database that provides a user with information about facilities and services available in some 5,000 ports would take the user almost 30 minutes to open and access the information stored in an owning agency's deeply archived, unimproved database when employing the most commonly used 57.6 kbps modem. Such a delay is unacceptable to ships at sea facing real-time emergencies.

Heretofore, there is no system for efficiently collecting relevant maritime data upon the request of the vessel and then distributing the data to the vessel. It is, therefore, desirable to overcome the above problem and others by providing a system where a service provider maintains a dynamic link to several databases and is responsive to a request by a vessel by transmitting current maritime data to the vessel while consuming a minimal amount of bandwidth and incurring a reduced amount of latency in the transmission of the data. Furthermore, it is desirable for the maritime data to be transmitted to the vessel in response to the vessel indicating its current location or expected location after a set period of time. It is also desirable to allow the vessel to make general and/or specific maritime data requests.

Still other desirable features of the invention will become apparent to those of ordinary skill in the art upon reading and understanding the following detailed description.

SUMMARY OF THE INVENTION

Accordingly, I have invented a system of collecting and distributing maritime data. The system includes a vessel configured to transmit a signal representative of a current location of the vessel and/or an expected location of the vessel to a service provider via a satellite communications network. A pre-determined zone of concern is established for each vessel. The zone of concern is either a three-dimensionally distance-bounded area surrounding the vessel or a time-bounded area surrounding the vessel. The service provider is configured to receive the signal and based upon the signal, retrieves one or more zone of concern data from databases in a computer network. The zone of concern data corresponds to maritime related information relevant to the zone of concern of the vessel. This may include, but is not limited to weather data, accident data, health crises data, piracy data, terrorism data, open warfare data, disease data, emergency re-routing data, political unrest data, coast guard assistance data, navigation lights data, reef data, shipwreck data and port contact information data. The service provider then transmits the zone of concern data to the vessel via the satellite communications network.

It is desirable for this system to maintain, update, integrate, and transmit maritime data received from various maritime related databases. The system minimizes the amount of communications bandwidth and/or communications time required to transmit the data to the vessel. By utilizing this system, a vessel need not inquire about any specific dangers, but is automatically informed of all known dangers or other relevant information that may be useful to the vessel. Additionally, the on-shore support team's role will be absorbed by this system. Furthermore, each request and request fulfillment may be logged by the service provider, so that if some unfortunate incident were to befall a vessel, a record of the immediate zone of concern data corresponding to the vessel's location, and perhaps the cause of the vessel's distress, may be reviewed. By subscribing to the system, not only will a vessel minimize the risk of encountering maritime dangers, but it may also benefit by obtaining discounted insurance rates from the insurance companies who insure the vessel and/or the vessel's cargo.

DETAILED DESCRIPTION OF THE INVENTION

The present invention will now be described with reference to the accompanying figures. It is to be understood that the specific system illustrated in the attached figures and described in the following specification is simply an exemplary embodiment of the present invention. For purposes of illustration, exemplary maritime related information and databases containing relevant maritime data will be described. Additionally, exemplary communications within the system are described as satellite and land-line based. However, these examples are not to be construed as limiting the invention in any manner.

Figure 1:
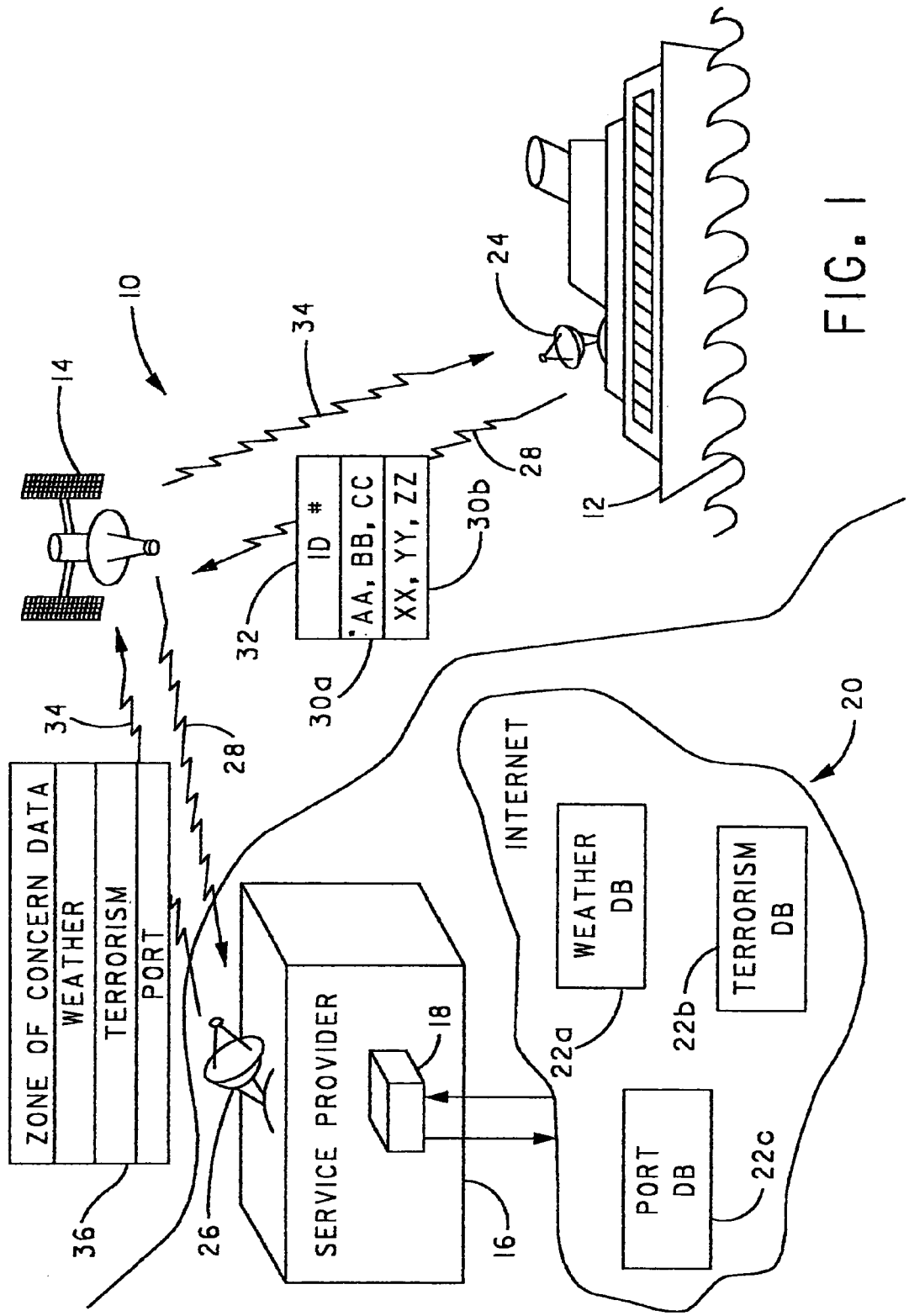
FIG. 1 is a schematic diagram of entities and communication links involved in a system for collecting and distributing maritime data.

With reference to FIG. 1, the entities and the communicative connectivity between the entities within a system 10 for collecting and distributing maritime data will now be described. In a desirable embodiment, system 10 includes a vessel 12 communicatively connected via a satellite 14 to a service provider 16. Service provider 16 maintains one or more servers 18 connected via a computer network 20, such as the Internet, to one or more databases, such as databases 22a-c.

Vessel 12, may include, but is not limited to commercial, research, governmental, and recreational vessels. In the desirable embodiment, vessel 12 is equipped with a two-way communications system, such as a vessel satellite transmitter/receiver 24. It is to be understood that vessel 12 may utilize other forms of communications systems, including, but not limited to radio, microwave, and laser. In terms of a user interface, the two-way communications system may utilize email, a browser, or other suitable software or hardware. Vessel satellite transmitter/receiver 24 is able to transmit and receive data to and from satellite 14, as part of a satellite communications network. The satellite communications network may be any data-capable transmission network, such as Inmarsat, a global mobile satellite communications service utilized by the maritime industry. Such a satellite communications network employs world-spanning, geo-synchronous satellites 14, to allow vessel 12 to communicate from virtually any body of water.

Service provider 16 transmits and receives data to and from vessel 12. In the desirable embodiment, service provider 16 utilizes a service provider satellite transmitter/receiver 26 in communication with satellite 14. Thus, a communications link is made between vessel 12 and service provider 16. It is to be understood that any communications between vessel 12 and service provider 16 may be encrypted, so as not to alert potential pirates of the vessel's status, location, heading, etc. Any suitable encryption algorithms or other secure methods ensuring private communications may be utilized. It is also to be understood that service provider 16 may utilize other forms of communication to transmit and receive data to and from satellite 14. For example, service provider 16 may be connected via a land line to a satellite communications intermediary (not shown), which is responsible for any satellite transmissions. Service provider 16 may include one or more servers 18. Server 18 is configured to process satellite communications data.

Additionally, server 18 is connected via computer network 20 to databases 22a-c. It is to be understood that server 18 may access any number of databases connected to computer network 20. Server 18 is also configured to process any data received from databases 22a-c.

In the desirable embodiment, databases 22a-c, namely, weather database, terrorism database and port database, respectively, contain up-to-date information in the form of data that is relevant to the safe, secure and economical operation of vessel 12. This information may be critical to the success of the vessel's voyage and the survival of its crew. Such information may include, but is not limited to weather data, accident data, health crises data, piracy data, terrorism data, open warfare data, disease data, emergency re-routing data, political unrest data and port contact information data. For example, weather database 22a may contain weather-related information, such as ocean current and storm data. Terrorism database 22b may provide terrorism-related information, which may include data on possible terrorist activity within an area, either at-sea or near a port. Port database 22c may include port information, such as recommended facilities and services available to a vessel's crew members. It is to be understood that a database in the broad sense may encompass a database system, wherein one or more individual databases reside. Thus, more than one of the above types of data may be found within a database. Furthermore, it is to be understood that a database may reside locally with service provider 16 in the form of a database including archived zone of concern data.

Databases 22a-c may be publicly accessible or may be privately accessible. For example, terrorism database 22b may be a Central Intelligence Agency operated database accessible to the public, whereas weather database 22a may be operated by a private entity that expends time and finances to maintain data on current worldwide weather conditions. Weather database 22a would therefore require service provider 16 to enter into a contract or license agreement with the database owner in order to access weather database 22a.

Since a different database owner may maintain each database, the structure and accessibility of each database may be proprietary. This requires that queries to a database are presented in a specific and precise format. For example, some databases may not be relational databases and, therefore, traditional query languages, e.g., SQL, may be ineffective in obtaining the data contained therein. Similarly, some purely web-based databases are only accessible through HTML forms. In effect, due to the proprietary nature of each database, service provider 16 is required to format each database query according to the type of database from which data is being sought. In addition to the proprietary nature of each database, each database is dynamic, in that the database owner continually updates the contents of the database, as new data becomes available. Therefore, it would be impractical for the relevant databases to simply be copied and placed on server 18 of service provider 16. To overcome this limitation, service provider 16 may establish real-time dynamic links with each database in order to extract the information demanded by the requesting vessel 12 at the time the inquiry is received. After the proper query is submitted by service provider 16, each database is configured to send the resultant data to server 18. The foregoing database examples are not to be construed as limiting, since it is to be understood that server 18 may be configured to access any type of database.

With continuing reference to FIG. 1, the operation of system 10 will now be described. Initially, vessel 12 enters into a subscription plan with service provider 16, whereupon service provider 16 agrees to collect, process and transmit relevant maritime related information to vessel 12. Service provider 16 may also provide vessel 12 with any requisite hardware or software required to implement system 10, although, it is to be understood that most vessels 12 are capable of receiving Internet derived data through their existing communications systems. Desirably, service provider 16 has implemented various protocols that allow for data transmissions to be transmitted to either standard or proprietary Inmarsat browsers situated on vessel 12.

In the desirable embodiment, vessel 12, while either at-sea or in-port, transmits a vessel signal 28 to service provider 16. Vessel signal 28 includes the vessel's location, preferably in latitudinal and longitudinal terms, 30a and 30b, respectively, and preferably expressed in a Degree Minute Second (DMS) format. Additionally, a unique identifier 32 is transmitted, that enables service provider 16 to identify vessel 12 and to verify the subscription plan of vessel 12. Alternatively or in addition to its present location, vessel 12 may transmit its expected location, either in terms of DMS or by current heading and nautical speed data. By transmitting this information to service provider 16, vessel 12 expects to receive immediate and accurate maritime information relevant to the safe, secure and economical operation of vessel 12.

Each vessel 12 is deemed to have a zone of concern associated with it. A zone of concern may be defined as a three-dimensionally distance-bounded or time-bounded area extending away from and surrounding vessel 12. For example, the zone of concern may be set as a 100 nautical mile radius in any direction from vessel 12. Similarly, the zone of concern may be set as encompassing 36 hours of estimated travel time from the present location of vessel 12. It is to be understood that a zone of concern is dynamic, it that it may change according to the present location of the vessel 12. Maritime related information that may be relevant to the zone of concern may be represented as zone of concern data. This may include, but is not limited to, weather data, accident data, health crises data, piracy data, terrorism data, open warfare data, disease data, emergency re-routing data, political unrest data, coast guard assistance data, navigation lights data, reef or shipwreck data and port contact information data, to name a few.

Once service provider 16 receives vessel signal 28, server 18 parses vessel signal 28 and creates the appropriate database queries. A query may contain the location of vessel 12 and optionally, the distance-bounded or time-bounded area relative to the location of vessel 12. As previously mentioned, due to the proprietary nature of each database, some of the database queries require a specific and precise format. Each query references either the precise or relative geographic location of vessel 12. This requires that server 18 convert the location of vessel 12, as transmitted by the vessel 12, into a format that is in keeping with the proprietary format for each database queried. For example, the DMS format utilized by the vessel 12 may need to be converted to a Degree Decimal format. Alternatively, the DMS format may need to be converted to a corresponding geographic region name, which is broader than the specific DMS format. Desirably, this conversion would be made on server 18 by utilizing a look-up table, or other suitable data structure. Thus, the query would not include the location of the vessel in a DMS format, but rather, would contain the geographic region name.

Consequently, server 18 queries each of databases 22a-c, either simultaneously, or in turn. The process of querying each database may be referred to as web crawling. Each database is responsive to the query's location of vessel 12, and optionally, the distance-bounded or time-bounded area relative to the location of vessel 12. The database then returns the corresponding zone of concern data to server 18. For example, if a query is submitted to weather database 22a, based upon the location embedded in the query, weather database 22a may return weather related zone of concern data, indicating that there is a mild northerly ocean current, with an 20% chance of hurricanes, and potential swells up to 5 feet in height within the immediate area. If the query also contains a distance-bounded area of 100 nautical miles from the current location of the vessel 12, the weather database may return additional information, indicating that 40 nautical miles north of the current position of the vessel 12 there is a strong northerly ocean current, with a 50% chance of hurricanes, and potential swells up to 20 feet in height. Zone of concern data may also encompass information not directly related to the safety of vessel 12. For example, a query to port database 22c may return information regarding the nearest port and the facilities and services offered, in relation to the current location of the vessel. This information may be useful, if for example, immediate medical attention is required of a crew member, requiring vessel 12 to come in-port.

If server 18 utilizes a real-time dynamic link to database 22, the data contained within database 22 has been previously repositioned on server 18 in a format that allows for almost instantaneous retrieval of the data. A traditional connection to a database may result in a greater latency between the time a query is submitted by server 18 and the time data is returned to server 18. Regardless of the database connection, it is to be understood that service provider 18, as opposed to vessel 12, directly retrieves the zone of concern data from the various databases 22a-c. As previously mentioned, not all databases may be relational databases, thereby requiring the download of the entire database, as opposed to downloading only the returned data. This is especially true if the database is in the form of a non-indexed list. Due to the prohibitive bandwidth time and cost involved with having to transmit the entire non-indexed list to vessel 12, service provider 16 is required to process the list to derive the requested zone of concern data. For example, a 5,000 port database in a non-indexed list may be reformatted by service provider 16 into 5,000 individual pages, allowing each port to become a unique index identifier. This allows data corresponding to each port to be more quickly accessed. It is to be understood that service provider 16 may utilize various techniques to search, retrieve, and manage zone of concern data from the various databases 22a-c. An additional time-saving technique involves server 18 locally archiving zone of concern data on a database managed by service provider 16. In the desirable embodiment, at predetermined intervals, server 18 transmits broad or generic queries to databases that are infrequently modified. The zone of concern data that is returned is then stored or updated in archival form in the database managed by service provider 16. If all or part of a request from vessel 12 can be fulfilled by zone of concern data residing on the database managed by service provider 16, then data retrieval will be almost instantaneous, as the extent of the necessary web crawling will be reduced.

After receiving the zone of concern data, server 18 is required to process the zone of concern data. Each of the various databases 22a-c may return zone of concern data having disparate formats or containing extraneous non-relevant information. Thus, server 18 may manipulate the zone of concern data in various ways, including, but not limited to adding to the data, re-arranging the data, reformatting the data, and stripping the zone of concern data of non-essential data. For example, if the zone of concern data indicates that there are unfavorable weather conditions near vessel 12, service provider 16 may append the zone of concern data with information relating to alternate routes to avoid the unfavorable weather conditions. The manipulation of the data may result in a more concise, thorough, and efficient transmission of the zone of concern data to vessel 12. By knowing the identity of vessel 12 that made the request for the zone of concern data, the server is able to format any outgoing zone of concern data into a format that is properly recognized, interpreted and displayed by vessel 12. For example, vessel 12 may implement a legacy or proprietary Inmarsat browser, as opposed to a standard Inmarsat browser. Thus, the zone of concern data formatted for a standard browser may not be compatible with a legacy browser. Additionally, system 10 must take into account that each of the major Inmarsat global mobile satellite communications providers may provide vastly different proprietary browsers.

Figure 2A:
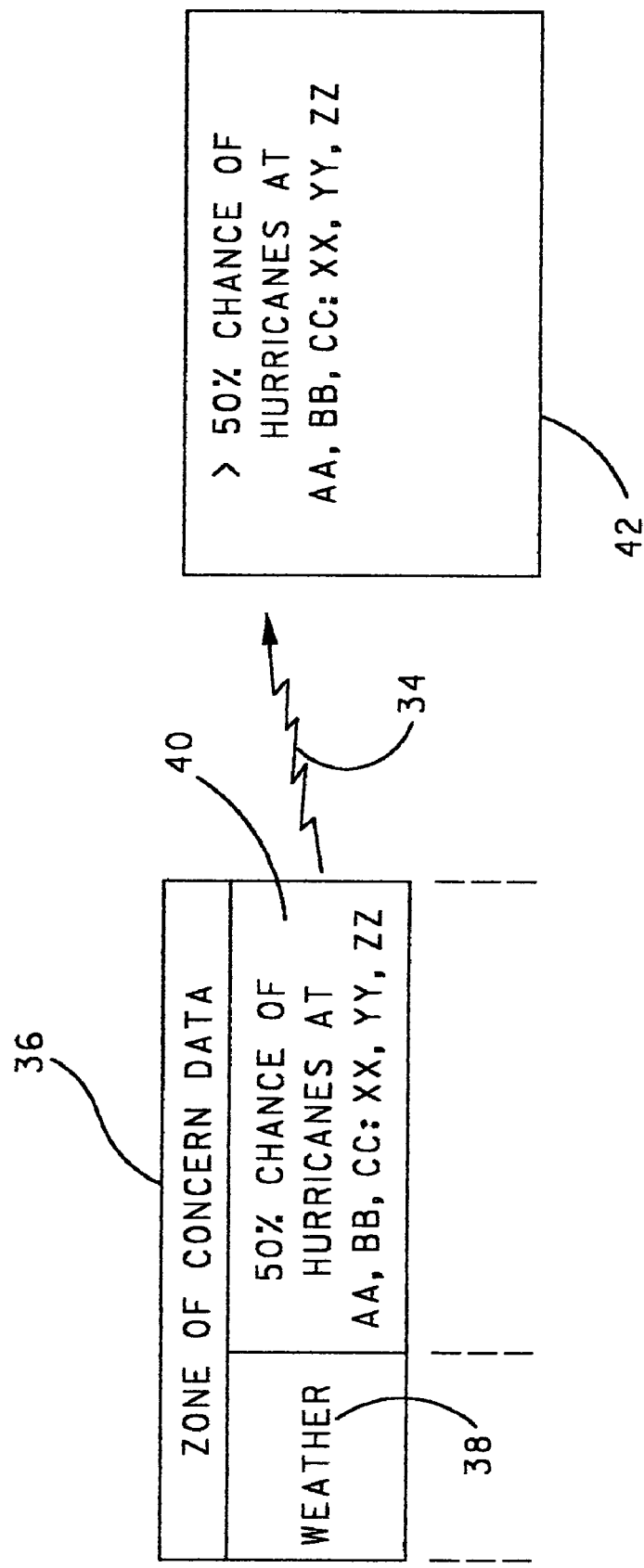
FIG. 2a is a schematic diagram of zone of concern data transmitted to a vessel and a corresponding display of the zone of concern data as it appears to the vessel.

With reference to FIG. 2a and with continuing reference to FIG. 1, the properly formatted zone of concern data is then transmitted by service provider 16 via a service provider signal 34 to vessel 12 as a zone of concern data packet 36. Zone of concern data packet 36 may include a zone of concern category 38 and a corresponding zone of concern text 40. For example, as illustrated in FIG. 2a, zone of concern category 38 may be entitled "Weather" and the corresponding zone of concern text 40 may be "50% chance of hurricanes at AA,BB,CC:XX,YY,ZZ." It is to be understood that vessel 12 may receive service provider signal 34 while either at-sea or in-port. It is also to be understood that in addition to transmitting zone of concern data packet 36 to vessel 12, zone of concern data packet 36 may also be transmitted to the on-shore support team assigned to and responsible for vessel 12. In the desirable embodiment, the two-way communications system of vessel 12 receives service provider signal 34, consequently parses zone of concern data packet 36 and thereby extracts the zone of concern data. The zone of concern data is then displayed within an email browser 42 of vessel 12. For example, email browser 42 in FIG. 2a displays "50% chance of hurricanes at AA,BB,CC:XX,YY,ZZ."

Thus, the crew members of vessel 12 will have immediate and accurate maritime information relevant to the safe, secure and economical operation of vessel 12 in relation to the present location and/or expected location of the vessel 12. In effect, by utilizing system 10, previously inaccessible data is automatically provided to vessel 12. Furthermore, vessel 12 is not required to inquire about any specific dangers, but is automatically informed of all known dangers or other relevant information that may be useful to vessel 12. This may be implemented by having vessel 12 transmit a request for zone of concern data based upon a predetermined schedule, such as once per day. Additionally, the vessel may manually make a general request for zone of concern data at any other time.

System 10 may also be configured to allow vessel 12 to make a specific request for information, in addition to a general request for zone of concern data. A specific request involves vessel 12 formulating a query that indicates to service provider 16 that vessel 12 requires specific information, such as a list of port agents in a specific country. A specific request may be entered into email browser 42 as either a simplified search string or a phrase. For example, if vessel 12 requires a list of all port agents in South Africa, vessel 12 would formulate and transmit a query such as "*South_Africa%Port_Agent*". Similarly, if vessel 12 requires a list of port agents in Cape Town, South Africa, the query may be formulated as "*South_Africa%Port_Agent%Cape_Town*". The query is then transmitted to service provider 16. Server 18 interprets the query and determines the proper database 22 for which to formulate its own query. After receiving the requested specific data from the database 22, as with a general request for zone of concern data, service provider 16 processes and then transmits the specific data to vessel 12.

Figure 2B:
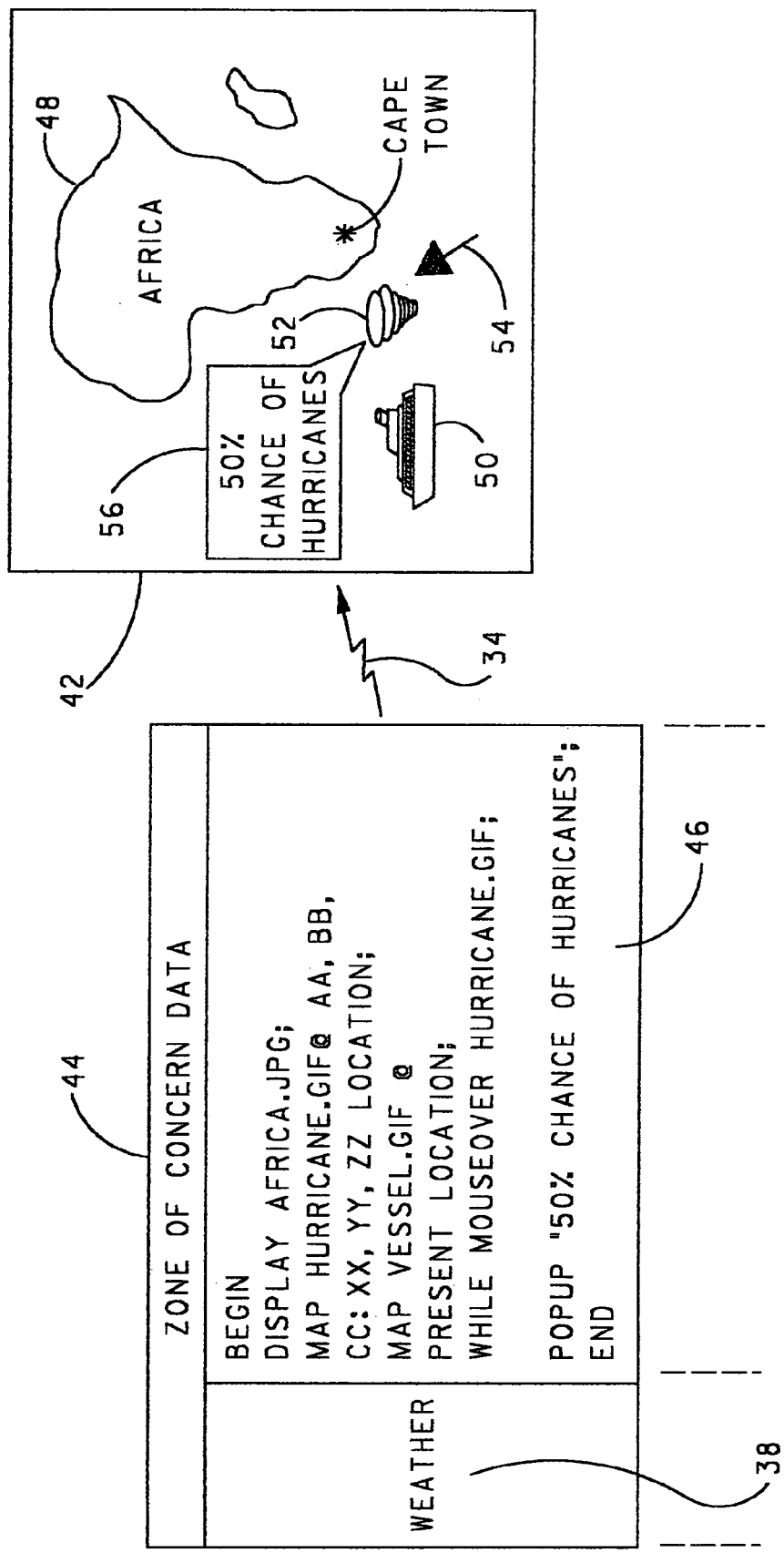
FIG. 2b is a schematic diagram of programmatic zone of concern data transmitted to the vessel and a corresponding display of the programmatic zone of concern data as it appears to the vessel.

With reference to FIGS. 2a and 2b, and with continuing reference to FIG. 1, FIG. 2b depicts an alternative embodiment zone of concern data packet 44. Similar to zone of concern data packet 36, the alternative embodiment zone of concern data packet 44 may include zone of concern category 38. Either, in addition to, or as a substitution to the zone of concern text 40, the alternative embodiment zone of concern data packet 44 includes programmatic data 46. Programmatic data 46 permits service provider 16 to present the zone of concern data in a more detailed or user-friendly manner. For example, programmatic data 46 may enable viewing of the zone of concern data in a dynamic, user-interactive, graphical format. This may be implemented by having vessel 12 maintain a local data set onboard. The local data set may include relatively static data that would be too time-consuming and cost prohibitive to be sent with each alternative embodiment zone of concern data packet transmission. Static data may include, but is not limited to, object images such as highly detailed vector-referenced maps. For example, object images may include, a map of Africa 48 (including its surrounding bodies of water), a vessel image 50, and a hurricane image 52. The static data may be stored in various computer readable medium, including, but not limited to a CD-ROM or a hard disk drive, and is to be accessible by the two-way communications system of vessel 12.

In processing the zone of concern data received from databases 22a-c, server 18 manipulates and formats the zone of concern data into programmatic data 46 compatible with email browser 42 of vessel 12. It is to be understood that the term "programmatic data" encompasses not only any suitable programming language, but is also inclusive of interpretive and scripted languages, such as HTML and JavaScript, respectively. Programmatic data 46 is then transmitted by service provider 16 via service provider signal 34 to vessel 12 as alternative zone of concern data packet 44. In the desirable embodiment, the two-way communications system of vessel 12 receives service provider signal 34, parses alternative embodiment zone of concern data packet 44 and extracts programmatic data 46. Depending upon the type of programmatic data 46 utilized, programmatic data 46 is then either compiled and executed, or is interpreted. This results in the zone of concern data to be displayed within email browser 42 of vessel 12. For example, programmatic data 46 depicted in FIG. 2b is exemplary pseudo-code that causes email browser 42 to display the zone of concern data in a dynamic, user-interactive, graphical format. Specifically, various static data from the local data set are depicted within email browser 42. The map of Africa 48 is placed within email browser 42. Vessel image 50 is placed on the map of Africa 48 according to the real-life latitudinal and longitudinal present location of vessel 12. Hurricane image 52 is placed on the map of Africa 48 at a location of hurricane activity, as indicated by weather database 22a. An example of a user-interactive element is the ability of the crew member of the vessel 12 to move his or her mouse-pointer 54 over any of the images displayed in email browser 42. This results in a pop-up 56 to appear that provides a more detailed description corresponding to the current activity illustrated in the email browser 42. For example, moving mouse-pointer 54 over hurricane image 52 results in the pop-up 56 to display "50% chance of hurricanes". An example of a dynamic element is the ability for the images to be automatically repositioned within email browser 42 as more current zone of concern data is received. For example, although the map of Africa 48 remains static, the positions of the vessel image 50 and hurricane image 52 may change depending upon the locations of vessel 12 and the hurricane activity, respectively.

The invention has been described with reference to the desired embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A system for collecting and distributing maritime data, comprising:
   a vessel configured to transmit a signal representative of one of (i) a current location of the vessel and (ii) an expected location of the vessel;
   a computer network including a plurality of databases, each of which includes one or more zone of concern data, wherein the zone of concern data corresponds to a zone of concern, wherein the zone of concern is one of (i) a three-dimensionally distance-bounded area surrounding the vessel and (ii) a time-bounded area surrounding the vessel, wherein the one or more zone of concern data is at least one of (i) accident data, (ii) health crises data, (iii) piracy data, (iv) terrorism data, (v) open warfare data, (vi) disease data, (vii) emergency re-routing data, (viii) political unrest data, (ix) coast guard assistance data, (x) navigation lights data, (xi) reef data, (xii) shipwreck data and (xiii) port contact information data; and
   a service provider configured to receive the signal, retrieve the one or more zone of concern data from the computer network based upon the signal and transmit the one or more zone of concern data to the vessel, wherein the service provider comprises at least one server, wherein the server is operative for:
      formulating a query as a function of one of (i) the location of the vessel and (ii) the expected location of the vessel;
      transmitting the query to the plurality of databases, wherein the databases are remote from the server and the vessel; and
      receiving the one or more zone of concern data associated with the query.

2. The system of claim 1, wherein the vessel is a water-faring vessel.

3. The system of claim 1, wherein the location and the expected location of the vessel is expressed in latitudinal and longitudinal terms.

4. The system of claim 1, wherein the signal further comprises a unique identifier identifying the vessel.

5. The system of claim 1, further comprising one or more satellites, wherein the satellite is operative for:
   receiving the signal from the vessel;
   transmitting the signal to the service provider;
   receiving the one or more zone of concern data from the service provider; and
   transmitting the one or more zone of concern data to the vessel.

6. The system of claim 1, wherein the server is operative for formatting the one or more zone of concern data to be compatible with an email browser of the vessel.

7. The system of claim 6, wherein the server is operative for stripping the one or more zone of concern data of any non-essential data.

8. The system of claim 6, wherein the server is operative for encrypting the one or more zone of concern data into an encrypted zone of concern data and transmits the encrypted zone of concern data to the vessel.

9. The system of claim 6, wherein the server is operative for formatting the one or more zone of concern data into programmatic data and transmitting the programmatic data to the vessel.

10. The system of claim 9, wherein the vessel includes a local data set, wherein the vessel is operative for:
    receiving the programmatic data;
    executing the programmatic data in the presence of the local data set; and
    displaying information as a result of executing the programmatic data, wherein the information is representative of the one or more zone of concern data in relation to the local data set.

11. The system of claim 10, wherein the vessel is operative for displaying the information in one of (i) a graphical format, (ii) a dynamic format, and (iii) a user-interactive format on the email browser of the vessel.

12. The system of claim 10, wherein the local data set is at least one object image.

13. The system of claim 1, wherein the server is operative for establishing a real-time dynamic link each of the databases.

14. The system of claim 1, wherein the server is operative for querying each of the databases at pre-determined times and storing the one or more zone of concern data on the server.

15. A system for collecting and distributing maritime data, comprising a service provider configured to:
    receive a signal from a vessel, wherein the signal is representative of one of (i) a current location of the vessel and (ii) an expected location of the vessel, wherein the vessel is a water-faring vessel;
    formulate a query as a function of one of (i) the location of the vessel and (ii) the expected location of the vessel;
    transmit the query to a plurality of databases in a computer network, wherein the databases are remote from the server and the vessel;
    receive one or more zone of concern data associated with the query, wherein the zone of concern data corresponds to occurrences associated with a zone of concern, and the zone of concern is one of (i) a three-dimensionally distance-bounded area surrounding the vessel and (ii) a time-bounded area surrounding the vessel, wherein the one or more zone of concern data is at least one of (i) accident data, (ii) health crises data, (iii) piracy data, (iv) terrorism data, (v) open warfare data, (vi) disease data, (vii) emergency re-routing data, (viii) political unrest data, (ix) coast guard assistance data, (x) navigation lights data, (xi) reef data, (xii) shipwreck data and (xiii) port contact information data;
    format the one or more zone of concern data; and
    transmit the one or more zone of concern data to the vessel.

* * * * *